(12) United States Patent
Karlsson et al.

(10) Patent No.: US 6,421,541 B1
(45) Date of Patent: Jul. 16, 2002

(54) ADAPTABLE BANDWIDTH

(75) Inventors: Ingemar Folke Karlsson, Kållered; Kent Olof Falk, Mölnlycke; Magnus Bonnedal, Partille, all of (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/488,314

(22) Filed: Jan. 20, 2000

(51) Int. Cl.[7] .................................................. H04B 7/00
(52) U.S. Cl. ........................ 455/509; 455/450; 455/452; 370/468; 370/437
(58) Field of Search ................................ 455/450–454, 455/464, 422, 507–509; 370/468, 437, 328, 329, 465, 466

(56) References Cited

U.S. PATENT DOCUMENTS

| | | | |
|---|---|---|---|
| 4,636,799 A | 1/1987 | Kubick | 343/754 |
| 4,706,094 A | 11/1987 | Kubick | 343/754 |
| 5,590,405 A | * 10/1993 | Daly et al. | 455/452 |
| 5,805,599 A | * 2/1996 | Mishra et al. | 370/468 |
| 5,812,938 A | 9/1998 | Gilhousen et al. | 455/69 |
| 5,920,545 A | * 7/1999 | Rasanen et al. | 370/232 |
| 6,298,042 B1 | * 10/2001 | Murase et al. | 370/235 |
| 6,337,849 B1 | * 1/2002 | Smith et al. | 370/230 |

FOREIGN PATENT DOCUMENTS

| | | |
|---|---|---|
| FR | 2757725 A | 6/1998 |
| GB | 2310972 A | 9/1997 |
| JP | 2113653 A | 4/1990 |
| JP | 4144317 A | 5/1992 |
| JP | 63262924 A | 10/1998 |
| WO | WO 93/10571 | 5/1993 |
| WO | WO 93/11618 A2 | 6/1993 |

OTHER PUBLICATIONS

Bengtsson, R., International Search Report, International App. No. PCT/SE99/02066, Mar. 24, 2000, pp. 1–3.
Hautaviita, N, International–Type Search Report, Search Request No. SE99/00066, Nov. 22, 1999, pp. 1–3.

* cited by examiner

Primary Examiner—Vivian Chin
Assistant Examiner—Duc Nguyen
(74) Attorney, Agent, or Firm—Jenkens & Gilchrist, P.C.

(57) ABSTRACT

A method and a system for maintaining a desired prescribed link quality from a communications terminal to a central node in a communications link system are described. A communication signal is transmitted from the communications terminal at a normal data rate on any given communication channel to the central node. The central node receiver then will order the communications terminal to step down its data rate if the central node receives poor signal quality. Then the central node will adopt its receiver channel bandwidth to the new lower data rate to obtain a desired power density per Hertz bandwidth, and simultaneously the central node will reallocate bandwidth no longer used for the particular communication terminal at the lower data rate to make this portion of its total bandwidth available for another channel in the communications link system. The method and system thereby provide an effective utilization of the available bandwidth at the system node. In a typical application the central node may be a communications satellite where it will be essential, due to interference and dynamical limitations, to maintain a desired power density per Hertz bandwidth.

12 Claims, 1 Drawing Sheet

ADAPTABLE BANDWIDTH

TECHNICAL FIELD

The present invention relates to a method for attenuation compensation in a communication system, and more exactly to a method to adapt the band-width as a result of signal attenuation.

BACKGROUND

To generate a high EIRP in a ground/space system either a large antenna or a transmitter having high output power is needed. A large antenna will become bulky, besides it will produce a smaller coverage while producing the higher output power and additionally it will become more expensive. In certain cases a part embracing more than 10 dB of the link budget is reserved only for compensation of weather conditions, which is one major reason for losses in microwave communication systems of this type. However, such conditions are prevailing only during a very small percentage of the time.

A further problem is that many satellite systems are interference limited, which implies that the entire dynamic range for weather changes and eventual changes in distance between transmitter and receiver must be compensated by a regulation of the transmitter output power. Dynamically this leads to that the transmitter working point for certain cases must be changed by more than 20 dB.

There are primarily found a number of Japanese documents addressing this problem. A document JP 63-262924A discloses a device for satellite communication, in which a decision circuitry calculates the excess of a precipitation attenuation over the range of power control and then changes the data rate to satisfy the prescribed line quality. Another document, JP 41-3044317A, also contemplates a way to keep the actual quality of a satellite communication line constant at all times by measuring a BER (bit error rate) of a loop-backed pilot signal and adjust transmission speed of the pilot signal to maintain a preset bit error rate independent of the channel attenuation. The result of the pilot signal measurement is then controlling the transmission power.

Still another document JP 21-13653A describes a method to effectively utilize frequencies in a simple constitution, and to effectively make them to function for various types of fading by providing a large capacity transmitting system and a small capacity transmitting system. The receiving condition is supervised by means of a receiving system, and a switching of transmitting systems between the transmitting side and receiving side takes place assisted by a switching control signal being the supervisory result. The small capacity transmitting system utilizes a narrowed transmission bandwidth. However the regulation takes place only in two steps and requires the equipment to be doubled.

Yet another method of addressing the problem is demonstrated by a document FR 2,757,725, A. This method utilizes several carriers in parallel, each of which periodically generates a symbol. The symbol occupies a bandwidth, which is divided into two sub-bandwidths and provides two half symbols. Thus each such bandwidth can transfer a "half symbol". Depending on the transmission conditions, a half or complete symbol may be transmitted.

It has also for instance been found suggestions to involve more coding in situation of bad weather, which also decreases the resulting net data rate.

Therefore there is a desire to present a method, which can still produce a good total efficiency of a system even if the data rate for a specific channel is decreased due to attenuation and fading of the specific link due to for instance precipitation for that specific path. If it would be possible to avoid an over-dimensioned link budget, it would result in cheaper and smaller ground terminals and possibly also cheaper and smaller satellites and/or higher transfer capacities.

SUMMARY

The present invention discloses a method in which the bandwidth is decreased instead of increasing EIRP in order maintain a same power density per Hz at the receiver in cases of poor weather conditions resulting for instance in precipitation attenuation or fading. This also leads to a reduced data transmission rate for the specific channel due to the poor weather conditions, but different from the state of the art, the reduced bandwidth instead allows more subscribers to be connected. Furthermore the dynamics of the transmitter output power regulation will only need to cover the steps of bandwidth regulation. If the bandwidth is reduced, for instance, by dividing by a factor two it will be enough with an order of 3 dB dynamics or ±1.5 dB in the regulation of the transmitter output power.

BRIEF DESCRIPTION OF THE DRAWINGS

The invention, together with further objects and advantages thereof, may best be understood by making reference to the following description taken together with the accompanying drawings, in which.

DETAILED DESCRIPTION

The adaptable bandwidth concept according to the present solution requires a closed loop system. The terminal communicates with a central, which might be a satellite, a node in a multiple-point system or a base-station. The central measures the received power level and supplies the terminal with instructions regarding which bandwidth and which part of the band it may use. The central station also manages the portion of the frequency spectrum made free such that it may be used elsewhere in the system. Preferably the system shall be designed to be so robust that it is sufficient to adapt the bandwidth in practical steps. It will even be possible to combine the adaptable bandwidth with a power tuning, but this makes the system more complex.

Figure 1:
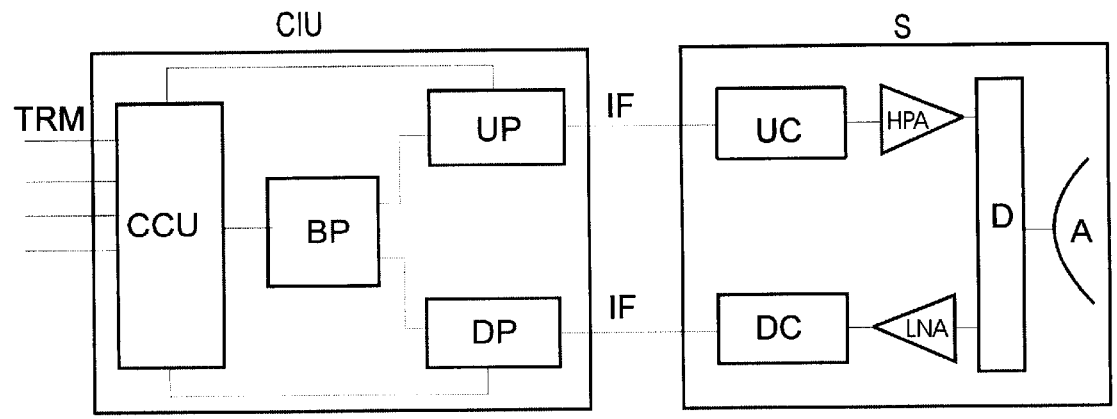
FIG. 1 is a block diagram illustrating an embodiment, which utilizes the adaptable bandwidth concept according to the present invention.

In FIG. 1 is demonstrated a block diagram for an embodiment of a terminal utilising a possible implementation of the adaptable bandwidth concept. Except for the variable bandwidth feature the design is similar to terrestrial radio link apparatuses like LMDS (Local Multi-point Distribution System) and satellite terminal concepts.

Figure 2:
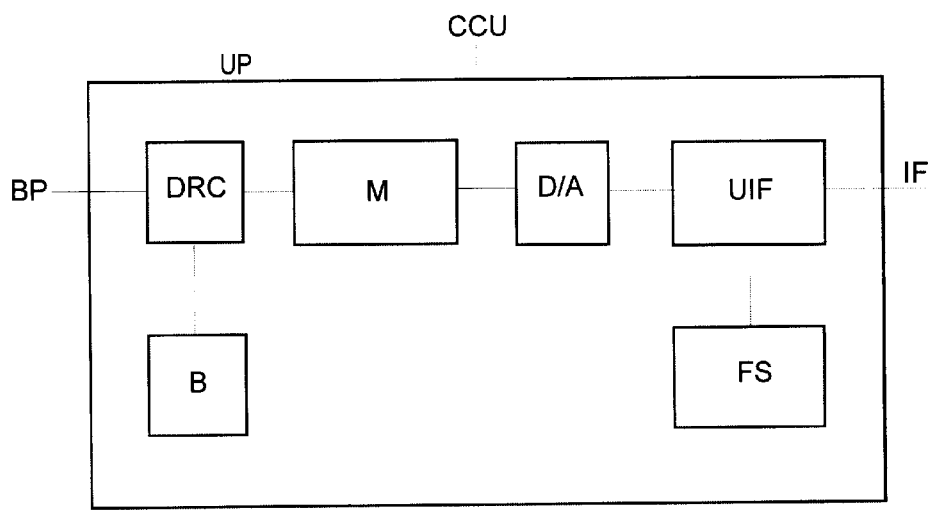
FIG. 2 is a block diagram, which illustrates an up-link processor.

The terminal control and interface unit, CIU, manages the function of the terminal. The CIU is provided with a set of terminals, TRM, which are adapted to be connected to a number of peripheral devices such as external networks, a personal computer, a telephone, a multimedia system, a TV, etc. The CIU comprises a central control unit CCU, a base-band processor BP, an up-link processor UP and a down-link processor DP. The CCU manages the overall control of the terminal and steers the processors. The base-band processor BP performs protocol adaptation, that is performing adaptations between the protocol for communication utilised by the system and the protocol or protocols utilised by the peripherals, for instance the IP protocol. The CCU also controls the access, security codes, billing and control of power and bandwidth allocations by addressing data and steering to the different processors. The up-link processor, UP, presented in FIG. 2 contains data rate control DRC, buffers B, a modulator M, a D/A converter, a frequency synthesiser FS and an up-converter, UIF, to the intermediate frequency IF. Based on the feedback from the central station the CCU adapts the data flow to the modulator, which results in a change in the bandwidth used. Which part of the band to be used is controlled by steering the frequency synthesizer FS. The bandwidth may be easily controlled digitally in steps of 3 dB. If power tuning is required it can be implemented in a number of ways, for example as a fine level adjustment of the IF signal level. A small power tuning of the order ±1.5 dB will then be sufficient in combination with a control of the data rate in steps with the use of a base of two.

The down-link processor DP comprises for example frequency generator, base-band down-converter, A/D converter, demodulator, Viterbi decoder. The up- and down-link processors are connected to a signal unit S (FIG. 1), which comprises an up-converter UC, a power amplifier HPA, a duplexer D, an antenna A, a low noise amplifier LNA and a down-converter DC.

An incoming high frequency signal from the antenna A goes through the duplexer D into the low noise amplifier LNA and is down-converted to IF frequency in the down-converter DC. The IF-signal then goes to the down-link processor DP where the signal is converted to base-band and demodulated. The data is then distributed to the proper terminal TRM by the central control unit CCU, which also reads administrative data, for example, information about bandwidth and power levels. Based on this information the data flow on the up-link is modified in the up-link processor UP. The up-link IF signal is transmitted and up-converted to high frequency in the up-converter UC. The signal is amplified in the power amplifier HPA and is passed through the duplexer D and then transmitted via the antenna A.

All of this, except for the bandwidth control, includes standard procedures for wireless communication and the number of possible implementation schemes will be numerous.

In an illustrative embodiment the inventive idea is generally applied for an up-link from a ground terminal to a communication satellite. In this communication an increased attenuation over the distance is compensated by a stepwise decreased bandwidth at a constant output power of the transmitter. The solution results in that power received per unit bandwidth in the satellite may be kept constant and the transmission error rate will be unchanged. Bandwidth not taken by the specific channel may then be utilized by other terminals and the operator gains optimal working conditions and occupancy of the satellite, and consequently a better economical standpoint for the system operator.

As already mentioned, a traditional standard way to handle increased attenuation has been to increase the transmitter power. According to the present method disclosed, a benefit will obviously be that the many terminals no longer do need to possess over-dimensioned power output amplifiers or big antennas, which otherwise do constitute a large part of the cost of a standard terminal. This saving will be considerable although a disadvantage of the method will be a lower transmission rate, but in many cases of communication the lowered data rate will be fully acceptable particularly if considering the cost per data bit in such a communication system.

The up-link is dimensioned for a nominal atmospheric attenuation and/or with little margin for other increased propagation loss. This will increase the system capacity during normal propagation conditions. As an example, a reduction of the margin with 10 dB, will during the time the margin is not required, increase the link capacity by roughly a factor 3.

When the margin is required in order to keep the link quality, the maximum available power of the up-link transmitter is concentrated to a bandwidth that is narrowed by the same factor as the increased link attenuation. The link capacity is reduced by the same factor, but the signal to noise density including co channel interference will remain constant.

The frequency band liberated by the attenuated channel can hence be used for other channels for which the capacity is increased, or for additional channels. The total system capacity will hence remain constant.

A second realization applies to CDMA systems. The configuration is similar to the first realization, with the exception that the modulation is different, the local oscillator, LO is fixed and the output filter is always appropriate for the transmitted band. When the link attenuation is increased, the data rate is reduced and the CDMA coding is changed, so that a smaller fraction of the total band capacity is used by the link. This may in the present case best be contemplated as keeping the energy per data bit constant, hence keeping the signal density constant at the receiver location, i.e. the power per bit.

Also in this case, a combination of power tuning and variable data rate can be used. If the data rate and hence the CDMA coding is changed in steps by a factor of two, the output power tuning can be used to balance the power per bit at the receiver.

It will be understood by those skilled in the art that various modifications and changes may be made to the present invention without departure from the scope thereof, which is defined by the appended claims.

What is claimed is:

1. A method for maintaining a desired prescribed link quality from a communications terminal to a central node in a communications link system, comprising the steps of:

arranging the communications terminal to utilize an essentially fixed output power amplifier;

transmitting from the communications terminal a communication signal at a normal data rate on any given communication channel to the central node;

receiving information of link quality from the central node;

arranging the central node receiver to order the communications terminal to step down its data rate when the central node receives poor signal quality in order to maintain a desired value of link quality at the central node receiver while still using an essentially fixed output power of the communications terminal;

adjusting the data rate of the communications terminal for a new communication channel bandwidth;

adjusting the central node receiver for the communication channel bandwidth adopted to the new lower data rate to obtain the desired power density per Hertz bandwidth;

reallocating bandwidth of the communications link system no longer used for the particular communication terminal at the lower data rate to obtain further available communication bandwidth at the central node for other channels then utilizing the bandwidth made free by the decrease of bandwidth for the particular terminal operating at the lower data rate, whereby the method provides an effective utilization of the available bandwidth at the system node.

2. The method according to claim 1, further comprising the step of adjusting the data rate in steps by using a base of two to make the adjustment easily controlled digitally.

3. The method according to claim 2, further comprising the step of adjusting the essentially fixed power by a factor of ±1.5 dB.

4. A system for maintaining a desired prescribed link signal quality from a communications terminal to a system node in a communications link system, comprising a communications terminal having an essentially fixed output power;

a signal quality control means to maintain a predefined power density per Hertz at all communication channels of the central node receiver;

a transmitting means transmitting from the communications terminal a communication signal at normal data rate on any given communication channel to the central node and receiving information of the link signal quality from the central node;

a first central node receiver control means which, controlled by the signal quality means, via a communication channel to the communications terminal, orders the communications terminal to step down its data rate, when the central node receives a poor link signal quality, in order to maintain a desired value of power density per Hertz bandwidth for the communication channel being allocated to the communications terminal;

a communications terminal control means to adjust the data rate of the communications terminal for a new communication channel bandwidth;

a central node receiver bandwidth control means adjusting the central node receiver for a new communication channel bandwidth adopted to the new lower data rate to obtain the desired power density per Hertz bandwidth as controlled by the signal quality means;

a second central node receiver control means reallocating bandwidth no longer used by the particular terminal now at a lower data rate to thereby obtain further available communication channels at the central node which will utilize the bandwidth made free by the decrease of bandwidth for the particular terminal operating at lower data rate, whereby the system will provide an effective utilization of the available bandwidth at the system node.

5. The system according to claim 4, comprising an adjustment of the data rate in steps by using a base of two to make the adjustment easily controlled digitally.

6. The system according to claim 5, comprising additional small adjustments of the essentially fixed power by a factor of ±1.5 dB around its medium power.

7. The system according to claim 4, wherein the communications link system central node constitutes a communication satellite.

8. The system according to claim 4, wherein the communications terminal control means comprises a terminal control and interface unit for managing the function of the terminal.

9. The system according to claim 8, wherein the terminal control and interface unit provides interfacing to at least one peripheral device and includes further a central control unit, a base-band processor, an up-link processor (UP) and a down-link processor.

10. The system according to claim 9, wherein said up-link processor contains a data rate control, buffers, a modulator, a D/A converter, a frequency synthesizer and an up-converter.

11. The system according to claim 9, wherein said down-link processor contains a frequency generator, a base-band down-converter, an A/D converter a demodulator and a Viterbi decoder.

12. The system according to claim 9, wherein the up-link processor and down-link processor are connected to a signal unit, which further includes an up-converter, a power amplifier, a duplexer, an antenna, a low noise amplifier and a down-converter, whereby the power amplifier and the low noise amplifier is connected to an antenna via the duplexer.

* * * * *

UNITED STATES PATENT AND TRADEMARK OFFICE
CERTIFICATE OF CORRECTION

PATENT NO. : 6,421,541 B1  Page 1 of 1
DATED : July 16, 2002
INVENTOR(S) : Ingemar Folke Karlsson et al.

It is certified that error appears in the above-identified patent and that said Letters Patent is hereby corrected as shown below:

Title page,
After "Item [22], Filed: Jan. 20, 2000" insert
-- [30] Foreign Application Priority Data
     Jan. 22, 1999 (SE) ……….. 9900195-0 --

Column 1,
Line 34, replace "JP 41-3044317A" with -- JP 41-44317A --

Signed and Sealed this

Eleventh Day of February, 2003

JAMES E. ROGAN
*Director of the United States Patent and Trademark Office*